June 21, 1932.         F. SILVA         1,863,768
RAT TRAP
Filed Sept. 17, 1930
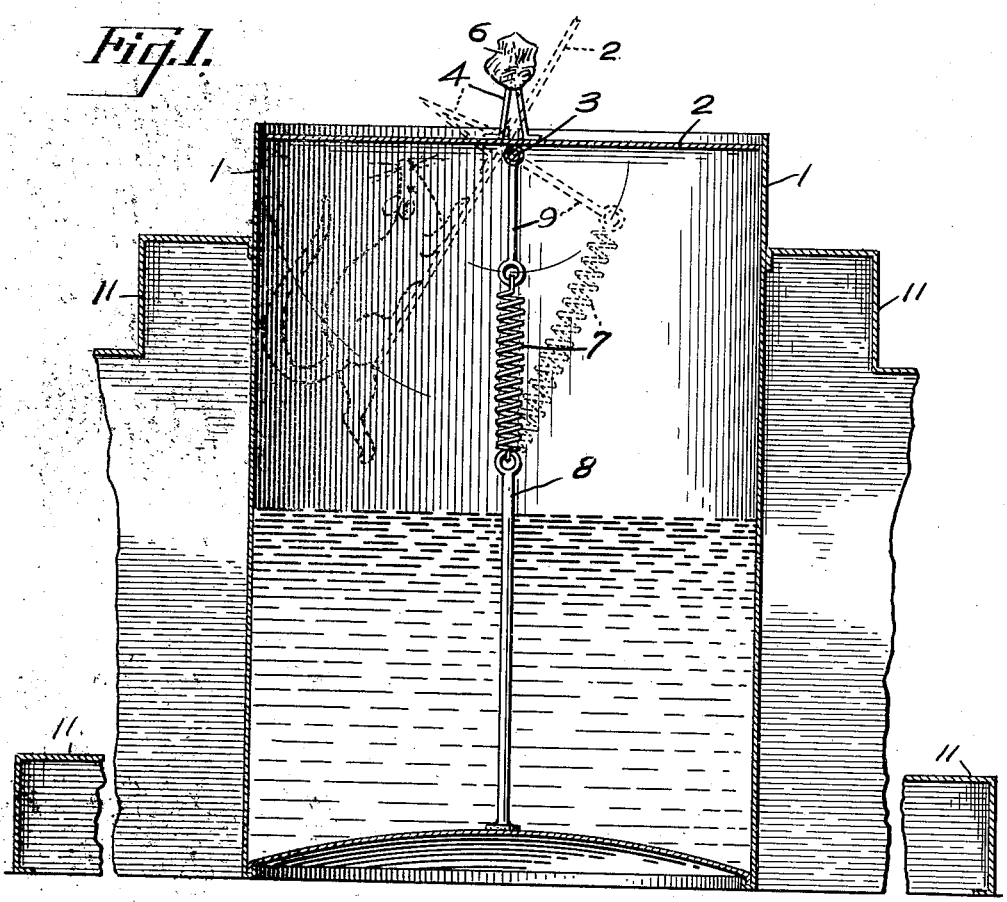
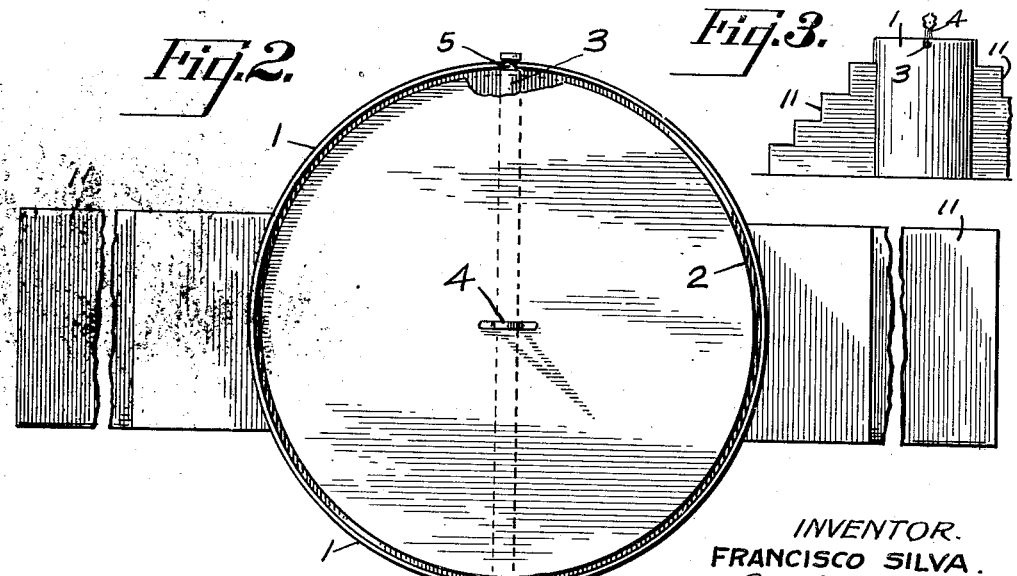
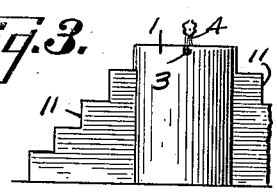
INVENTOR.
FRANCISCO SILVA.
By Arthur L. Slee.
HIS ATTORNEY.

Patented June 21, 1932

1,863,768

UNITED STATES PATENT OFFICE

FRANCISCO SILVA, OF SAN FRANCISCO, CALIFORNIA, ASSIGNOR OF ONE-HALF TO ANTONIO PEREIRA, OF SAN FRANCISCO, CALIFORNIA

RAT TRAP

Application filed September 17, 1930. Serial No. 482,492.

My invention relates to improvements in traps for destroying rats and the like wherein a container, partially filled with liquid, is provided with a pivoted cover arranged to be displaced by the weight of a rat imposed thereon to drop said rat into the container and the liquid therein to kill the rat and any vermin carried thereby.

The primary object of my invention is to provide an improved trap to catch and destroy rats or the like.

Another object is to provide an improved rat trap which effectually destroys fleas, insects, or vermin of any kind carried by rats caught in the trap.

A further object is to provide an improved trap which is automatically reset after catching a rat, and in which a large number of rats may be caught with a single baiting.

Another object is to provide an improved device of the character described provided with approaches whereby rats attracted by bait may be led to ascend onto the trap at desired points.

A still further object is to provide an improved trap of extremely simple and efficient operation and embodying improved details of construction obtaining economy and efficiency in manufacture and in operation.

I accomplish these and other objects by means of the improved device disclosed in the drawing forming a part of the present application wherein like characters of reference are used to designate similar parts throughout the specification and drawing, and in which—

Fig. 1 is a broken vertical mid-section of my improved rat trap.

Fig. 2 is a broken plan view of the device as shown in Fig. 1; and

Fig. 3 is a broken side elevation drawn upon a greatly reduced scale, and illustrating the arrangement of the approaches.

Referring to the drawing, the numeral 1 is used to designate a container, arranged to receive a quantity of liquid chemical suitable for destroying vermin and the like. The container is preferably of cylindrical form having smooth vertical side walls and a closed bottom formed from sheet metal or other suitable material. A cover member 2 is pivoted within the open top of the container 1 preferably upon a diametrically disposed pivot shaft 3. The cover 2 consists of a flat disc of sheet metal or other suitable material arranged to be received within the open top with its edges just clearing the inner surface of the side walls of the container and disposed substantially in the plane of the top of the container. The ends of the shaft 3 are grooved as at 5 to engage recesses formed in the upper edge of the containing wall to center the cover relative to the top of the container and prevent friction between the edge of the cover and the container.

A bait supporting member 4 is secured upon the upper surface of the cover 2, preferably at substantially the center thereof, to receive suitable bait 6 secured thereto.

A spring 7 is arranged to normally move the cover to a normal closed position extending across the open top of the container. The spring is preferably connected at its lower end to a rod 8 axially disposed within the container and secured to the bottom thereof, and the upper end of the spring is preferably connected to an arm 9 fixed to the cover and extending axially downward from the center of the cover normal to the surface thereof. The spring is arranged to normally exert a slight downward pull upon the arm whereby the arm is moved to axial position within the container and thereby moving the cover to its normal position substantially in the plane of the top of the container. The spring 7 is designed to yield when the weight of a rat or other animal is imposed upon the cover upon either side of the pivot shaft 3 whereby the cover may be tipped from its normal closed position with one edge extending downwardly into the container.

Approaches 11 may be mounted at the sides of the container 1 whereby rats or the like may ascend to the top of the container when attracted by the bait 6. The approaches are preferably formed from sheet metal in the form of steps and are disposed at right angles to the axis of the pivot shaft 3 so that rats ascending the approaches will impose their weight upon the free edges of the cover member 2.

In operation, the container is partially filled with water, oil, or other desired liquid, such as a liquid chemical for destroying vermin and the like, and is placed in any suitable location frequented by rats, or other animals sought to be exterminated. Bait 6 of any suitable nature is applied upon the bait supporting member 4 to attract the rats or other animals onto the cover 1. When a rat ascends one of the approaches 11 in an effort to reach the bait 6, the weight of the rat is imposed upon the cover 2 upon one side of the pivot shaft 3, thereby causing that side of the cover to be displaced downwardly into the container, as the cover is turned upon its pivot mounting under the weight of the rat, and dropping the rat into the container and the liquid contained therein. As soon as the cover is released from the weight of the rat, the spring 7 automatically returns the cover to its normal position and the trap is ready to receive another rat, the cover being automatically reset after each rat is caught.

The rats, upon dropping into the liquid within the container, are drowned or killed by chemical action of the liquid. At the same time, fleas, or vermin of any kind carried by the rats are also killed, thereby preventing the escape of said vermin. This feature of my invention is of particular importance, as fleas and other vermin carried by rats are carriers of disease. Such vermin commonly leave the body of a dead rat, and one of the important purposes of the present invention is to exterminate such vermin when the rat is caught, rather than to permit the spread of said vermin as when a rat is caught and killed in an ordinary trap.

While I have illustrated what I now regard as the preferred embodiment of my invention, specific details of construction and arrangement are of course subject to modification in various ways without departing from the spirit of my invention, and I therefore desire to avail myself of all modifications which may fall within the scope of the appended claim.

Having thus described my invention, what I claim as new and desire to secure by Letters Patent is:

An animal trap comprising a container, a cover pivotally mounted at the top of the container upon a pivoted rod extending diametrically across the container, the said cover being normally positioned to close the top of the container, a downwardly disposed bar rigidly secured to the rod, and a spring attached at one end to the bar and secured at its opposite end to a stationary anchor, the said spring being adapted to restore the cover to its normal position after the latter has been moved by the weight of an animal into a position whereby the animal is discharged into the container.

In witness whereof, I hereunto set my signature.

FRANCISCO SILVA.